Jan. 10, 1956 J. J. AYRES ET AL 2,730,683

SLIDING CONNECTOR

Filed Sept. 29, 1954

INVENTORS
LEROY H. SHANIN
BY JAY J. AYRES
Morris A. Rabkin
ATTORNEY

United States Patent Office 2,730,683
Patented Jan. 10, 1956

2,730,683

SLIDING CONNECTOR

Jay J. Ayres, Washington Township, Gloucester County, N. J., and LeRoy H. Shanin, Philadelphia, Pa., assignors to Radio Corporation of America, a corporation of Delaware Application September 29, 1954, Serial No. 459,190

5 Claims. (Cl. 339—17)

This invention relates to a connector, and more particularly to a sliding connector for use with printed circuit boards.

In the development of electronic apparatus for mass production, increasing attention has been given to the physical arrangement of the apparatus in order to decrease the size and to permit ready access for servicing such apparatus and also to increase the adaptability of such apparatus to mass production methods. The development of printed circuitry has been a substantial step toward the attainment of these ends, and the present invention is concerned with a connector for use in conjunction with printed circuit boards or modules which have printed terminals spaced along the edges thereof whereby the modules may be connected to other portions of the circuit.

An object of this invention is to provide a novel connector for use with printed circuit boards or modules.

Another object of this invention is to provide a novel connector for use with printed circuit boards in which a board may be inserted either from a face of the connector or from an end thereof.

A further object of this invention is to provide a novel connector in which a printed circuit board may be inserted or removed from an end thereof without engaging the connector contacts during said insertion or removal.

A still further object of this invention is to provide a novel connector for use with printed circuit boards wherein the danger of stripping the printed terminals from the boards during insertion and removal thereof is substantially eliminated.

A still further object of this invention is to provide a novel connector which provides for electrical connection in six alternative paths.

To accomplish these and, perhaps, other objects a connector is provided which is made up of an elongated rectangular block composed of an insulating material. For the purpose of description, the block will be assumed to be oriented in a horizontal position. The block is provided with vertical apertures which extend in a row along its longitudinal dimension and which are spaced to correspond with the spacing of the terminals on a printed circuit board. Each of these apertures accommodates a vertical conductor which extends through the block and a pair of contact members which are secured to the block and are electrically connected to the conductor. A groove is provided on either side of the block to receive and support the edge of a printed circuit board. A cam member extends through the block beneath each of these grooves. The free ends of the contact members extend laterally, in relation to the longitudinal dimension of the block, to an area beneath one of these grooves and over the corresponding cam member. These contact ends are spaced to coincide with the spacing of the printed circuit terminals and these terminals, which are on the under side of the circuit board, will lie directly over the contacts when the board is properly inserted in a groove. When a cam member is rotated, the free ends of the corresponding contacts are urged upwardly against the terminals of the printed circuit board to provide good electrical contact therebetween.

The novel features of the invention, as well as additional objects and advantages thereof, will be understood more fully from the following description when read in connection with the accompanying drawing, in which.

Figure 1:
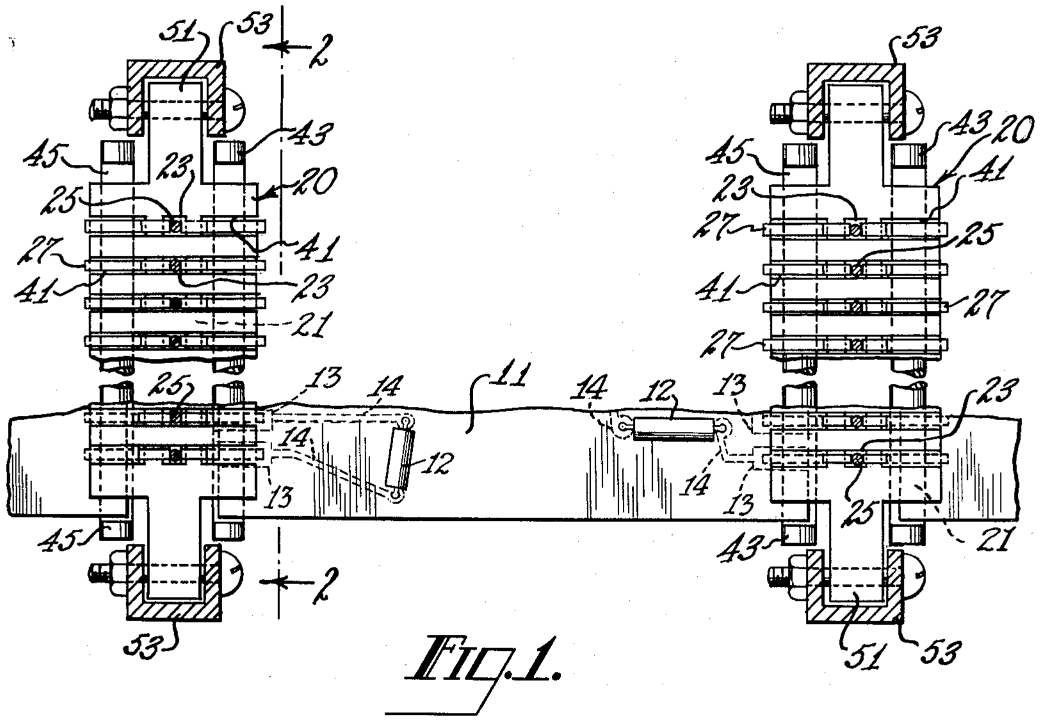
Figure 1 is a plan view partially in section of a pair of connectors, in accordance with the present invention, supporting a partially cut away printed circuit board between them.
Figure 2:
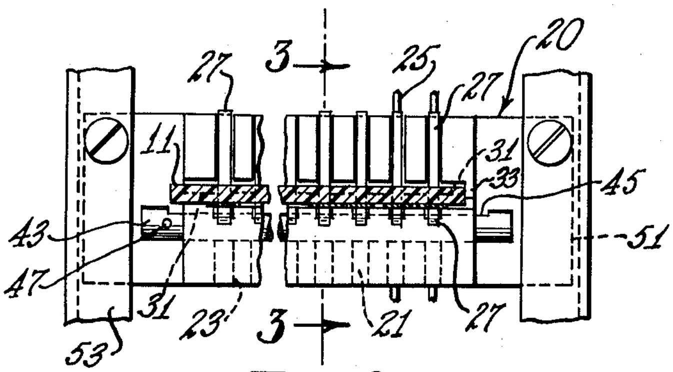
Figure 2 is a sectional elevation on line 2—2 of Figure 1 as viewed in the direction of the arrows to show one of the connectors.
Figure 3:
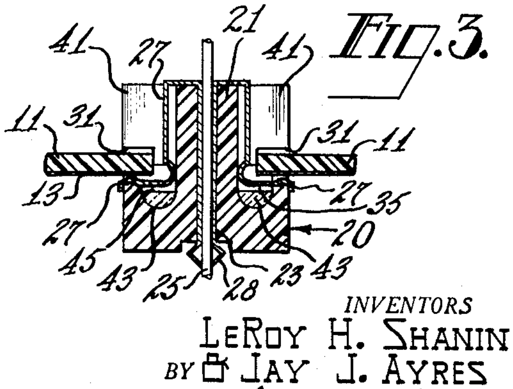
Figure 3 is a sectional view taken along the line 3—3 of Figure 2 looking in the direction of the appended arrows and showing the cams in the lowered position.
Figure 4:
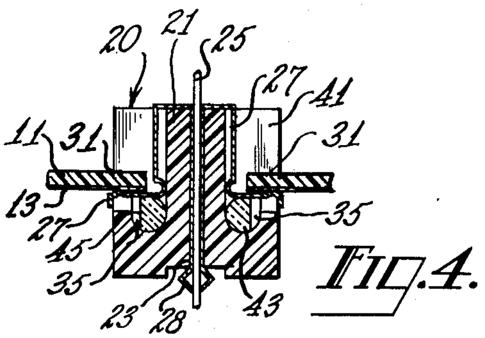
Figure 4 is a view similar to Figure 3 showing the cam in the raised position.

Referring in more detail to the accompanying drawing, a pair of connectors 20 is illustrated as being used to support a printed circuit board or module 11 which is or may be rectangular in shape. These boards have parallel rows of terminals 13 provided adjacent opposite edges thereof and which are spaced at predetermined fixed intervals. Electrical or electronic components 12, which are mounted on the board 11, are electrically connected by means of printed wiring 14 to the terminals 13.

Each of the connectors 20 is comprised of an elongated, substantially rectangular block 21 which is composed of an insulating material. A number of parallel apertures 23 extend through the block from top to bottom and are aligned in the vertical plane which divides the block along its longitudinal dimension. Each of these apertures 23 is provided to accommodate a vertical conductor 25 and a pair of spring contacts 27 which will be described subsequently. The conductors 25 provide means for external connections to the connector 20 and may extend through adjacent vertically stacked connectors to provide interconnection between them and the boards supported therein. A rectangular groove 31 is provided on each side of the block 21 and extends over the length of the block. These grooves accommodate the edge of a printed board 11 and a stop member 33 is provided at one end of the groove so that the board 11 may be properly positioned therein. A trough 35 extends longitudinally through the block 21 underneath each of the grooves 31. These troughs are semi-circular in cross section and are dimensioned to accommodate rod like cam members to be described subsequently.

A number of notches 41 corresponding to the number of apertures 23 are provided along either side of the block 21. These notches 41 are aligned in pairs transversely of the longitudinal dimension of the block 21 and each pair is further aligned with one of the apertures 23. These notches are rectangular as viewed from the end of the block and extend from the top of the block downward through the grooves 31 and to a point where they intersect the top portion of the troughs 35. These notches 41 and apertures 23 are spaced longitudinally to correspond with the spacing of the terminals 13 on the printed boards 11.

Each of the spring contacts 27 is provided with a kink 28 at one end thereof. This kink helps to retain the contact in the block and provides a means for holding solder when the contact is soldered to a conductor 25. When a contact 27 is inserted in the block 21, this kink 28 is positioned on the underside of the block. The contact then extends from this point upwardly through an aperture 23, outwardly to one of the notches 41, downwardly to the bottom of the notch 41 or to the trough 35, and then outwardly to the side surface of the block. When a board 11 is inserted into one of the grooves 31, the free end of the contacts 27 will lie underneath the edge of the board.

A rod like cam 43 lies in each of the troughs 35 and extends substantially the length of the block 21. These cams are circular in cross section over a portion of their length and have a diameter slightly smaller than the diameter of the troughs 35. The portion of the cam 43 which lies in the area of the contacts 27 has a portion of the cylindrical surface cut away so that a flat 45 is provided. Means, such as an aperture 47, are provided at one end of each cam 43 so that it may be rotated within its trough 35.

When a printed board 11 is inserted in a block 21, it is oriented so that the components lie on the upper side of the board and the printed wiring and terminals 13 are of the under side of the board. The board is aligned in the block 21 so that each of the terminals 13 lies directly over the free end of one of the contacts 27. While the board is being inserted, the cam 43 is positioned so that the flat 45 faces upward. In this position of the cam, the free ends of the contacts 27 are held in the bottom of the notches 41 due to their inherent spring tension and therefore extend into the troughs 35. When the board has been inserted, the cams 43 are rotated 90° in either direction so that the flat 45 is facing one side or the other of the block 21. This rotation of the cam 43 causes the free ends of the contacts 27 to be urged upwardly against the spring tension of the contacts and to be pressed against the printed board terminals 13; hence, providing the electrical connection between these terminals 13 and the conductors 25.

A mounting extension 51 is provided at each end of the block 21 so that the connector 20 may be supported by vertical channel members 53, for example.

A feature of a connector of this type is that a printed board 11 may be inserted into the connector from either of two directions, laterally from the side of the connector or longitudinally from the end of the connector.

Another feature of this connector is that while the boards are being inserted into the connector the contacts are not urged or biased against the module and therefore there is no wear or friction between the terminals 13 and the contacts 27. This feature is especially important where the boards are inserted from the end of the connector since the terminals on the leading end of the board 11 might pass over twenty-four contacts, for instance, before reaching its own contact. This means that after a board is inserted and removed several times, these leading terminals 13 would experience considerable wear. Further, it should be considered that these printed terminals are relatively fragile and might be separated from the base due to the spring force of the contacts, and thereby render the printed board useless.

Another feature of this connector is that with the cam arrangement above described, a considerable contact pressure may be brought to bear on the terminals 13 after the boards are inserted to provide a good electrical contact between the contacts and terminals. This pressure is considerably more than could be applied by spring contacts not actuated by cams and which would press against the board during their insertion and removal.

Another feature of this connector is that at each of the contacts, six possible electrical paths are provided as follows: A path is provided directly across the connector from one module to another: Another path is provided directly through the connector by means of a conductor 25: Alternative paths are provided from a module on one side of the connector either upwardly or downwardly through a conductor 25: The fifth and sixth paths in the illustrative embodiment are provided from a module on the other side of the connector either upwardly or downwardly through a conductor 25. Hence, the conductor when used in an electrical assembly provides for great versatility in circuit arrangement.

A connector is disclosed herein which may be employed, for example, in the formation of connector racks which are composed of vertically stacked horizontal connectors which are interconnected by means of vertical conductors. These racks, in turn, may be spaced horizontally so that printed circuit boards may be inserted therebetween in a horizontal manner and be supported by a pair of the above described conductors. In this manner a complete circuit structure is provided which is compact, which is adapted to automatic production methods and which is inherently simple to service.

What is claimed is:

1. A connector for use with a printed circuit board having spaced terminals thereon, said connector comprising an elongated block having a groove extending along either side thereof adapted to receive an edge of a printed circuit board, apertures in said elongated block, spaced vertical conductors extending through said elongated block in said apertures, spring contact members mounted on said elongated block and electrically connected each to one of said conductors, each of said contact members having at least one free end extending toward one of said grooves, said elongated block having a number of spaced notches extending downwardly from said grooves and adapted to receive said free ends of said contact members, said contact member being biased to lie in said notches beneath said grooves, and a cam member extending through said elongated block beneath each of said grooves, said cam member being adapted, in one position, to urge said free ends of said contact members upwardly into said grooves whereby said free ends may engage the terminals of a printed circuit board.

2. A connector for use with a printed circuit board having spaced terminals thereon, said connector comprising an elongated block having a groove extending along either side thereof adapted to receive an edge of a printed circuit board, apertures in said elongated block, vertical conductors spaced along said elongated block and extending through said block in said apertures, spring contact members mounted on said elongated block, a pair of said contact members electrically connected to each of said conductors, each of said contact members having a free end extending toward one of said grooves, said elongated block having a number of spaced notches extending downwardly from said grooves and adapted to receive said free ends of said contact members, said contact members being biased to lie in said notches beneath said grooves, and a cam member extending through said elongated block beneath each of said grooves, said cam member being adapted, in one position, to urge said contact free ends of said contact member upwardly into said grooves whereby said free ends may engage the terminals of a printed circuit board.

3. A connector for use with a printed circuit board having spaced terminals thereon, said connector comprising an elongated block having a groove extending along either side thereof and transverse vertical apertures aligned therealong and extending therethrough, an electrical conductor extending through each of said apertures, said grooves being adapted to receive an edge of a printed circuit board, means defining a trough lying beneath each of said grooves and extending the length of said block, said block being provided with a plurality of notches disposed along either side thereof and extending downwardly from the top of the block to intersect the top of said troughs, an electrical contact member attached to each of said conductors having at least one free end extending downwardly through one of said notches and outwardly across one of said troughs, and a cam member in each of said troughs, said cam members being adapted in one position thereof to force the free ends of said contact members upwardly into said grooves whereby said free ends may engage the terminals of a printed circuit board.

4. A connector for use with a printed circuit board having spaced terminals along parallel edges thereof, said connector comprising an elongated insulating block having a groove extending along either side thereof and having transverse apertures spaced therealong and extending therethrough in a vertical direction, an electrical conductor extending through each of said apertures, said grooves being adapted to receive an edge of a printed circuit board, means defining a trough lying beneath each of said grooves and extending the length of the block, said block being provided with a plurality of notches spaced along either side thereof extending downwardly from the top of the block to intersect the top of one of said troughs, each of said notches being laterally aligned with one of said transverse apertures, an electrical contact member attached to each of said conductors and having a free end extending downwardly through one of said notches and outwardly across said trough, and a rod like cam extending through said block in each of said troughs, said cams being adapted in one position thereof to urge said contact member free ends upwardly into said grooves whereby said free ends may engage the terminals of a printed circuit board.

5. A connector for use with printed circuit boards having spaced terminals along parallel edges thereof, said connector comprising an elongated insulating block having vertical apertures spaced therealong and extending therethrough and having rectangular grooves extending along each side thereof, each of said grooves disposed to receive an edge of a printed circuit board, means defining a trough beneath each of said grooves, said elongated block having a plurality of notches spaced along either side thereof and extending downwardly from the top thereof to a point beneath said rectangular grooves, said notches being spaced to correspond with the spacing of said printed board terminals, a pair of spring contacts inserted in each of said vertical apertures, each of said spring contacts extending from a point on the underside of said block upwardly through a vertical aperture, outwardly in one direction to one of said spaced notches, downwardly in said notch to a point beneath one of said rectangular grooves and outwardly to the side of said block, a pair of rod like cams extending through said block in each of said troughs, said spring contacts being biased downwardly against said cams, said cams being disposed in one position to engage said contacts and to urge said contacts upward to engage a printed board in said groove, a plurality of vertical conductors extending through said vertical apertures, and means for connecting each of said conductors to one of said pairs of contacts.

References Cited in the file of this patent

UNITED STATES PATENTS 1,393,822 Parker ------------------ Oct. 18, 1921